July 17, 1962   H. ERNST   3,045,144
ARC FURNACE ELECTRODE CONTROL MEANS
Filed Feb. 3, 1959
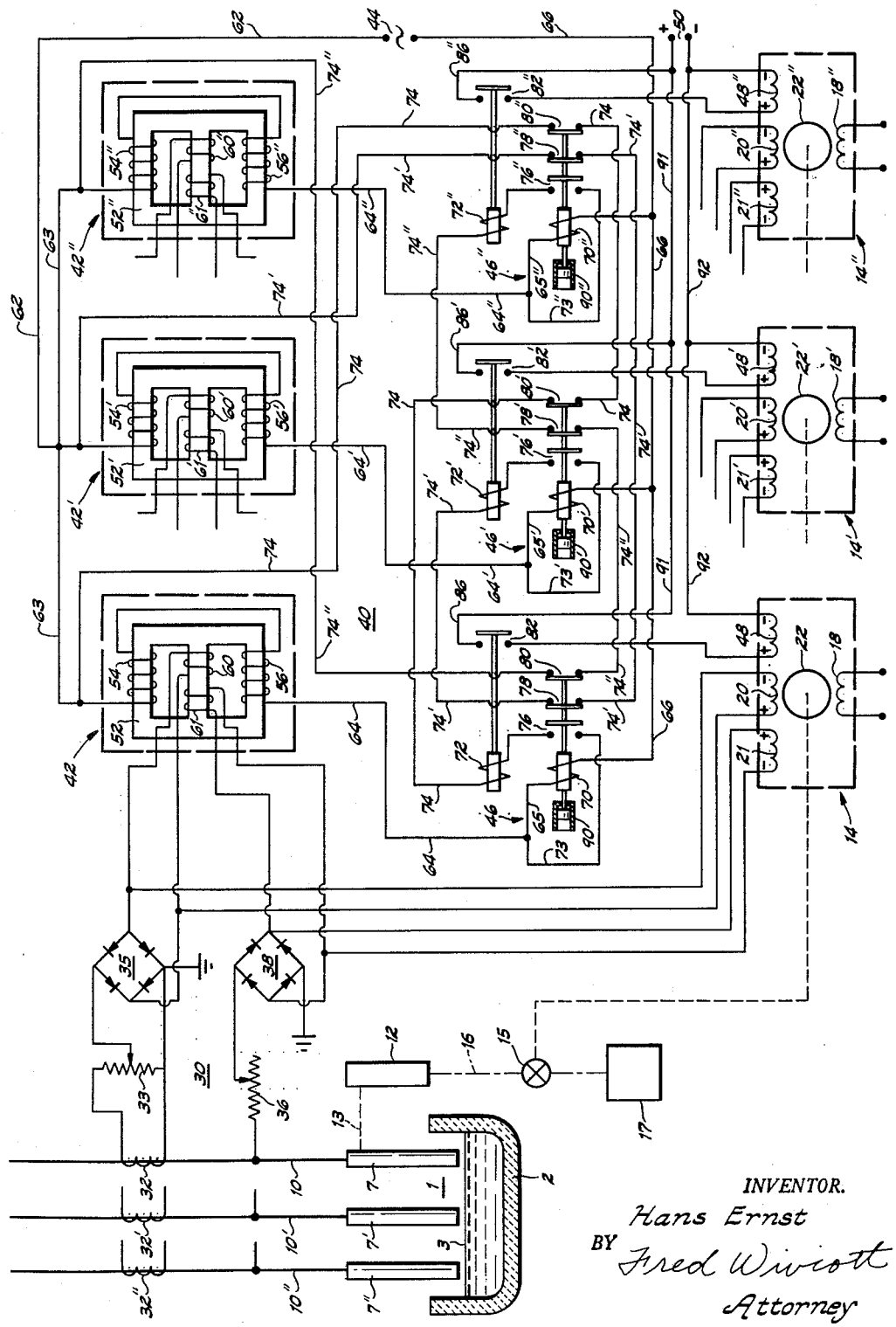
INVENTOR.
Hans Ernst
BY Fred Wiviott
Attorney

United States Patent Office 3,045,144
Patented July 17, 1962

3,045,144
ARC FURNACE ELECTRODE CONTROL MEANS
Hans Ernst, Duisburg, Germany, assignor to DEMAG-Elektrometallurgie G.m.b.H., Duisburg, Germany, a corporation of Germany
Filed Feb. 3, 1959, Ser. No. 790,847
Claims priority, application Germany Feb. 15, 1958
7 Claims. (Cl. 314—31)

This invention relates to electric arc furnaces and more particularly to apparatus for controlling the position of arc furnace electrodes.

It is common practice in the production of high grade steel to utilize polyphase electric arc furnaces having a plurality of electrodes and electrode positioning means associated with each of the electrodes. Current flows in such furnaces from the electrodes to the furnace charge and then to one of the other electrodes. That portion of the current path between the electrodes and the furnace charge comprises an arc, which provides the heat necessary for furnace operation. The electrode positioning means is adapted to position each of the electrodes is accordance with the length of its respective arc as indicated by the arc current and the arc voltage so that when the arc current rises, indicating that the arc is too short, the electrode is raised and when the arc voltage rises, indicating that the arc is too long, the electrode is lowered. In such furnaces no current will flow until a pair of electrodes are in close proximity to the charge so that an arc can be drawn therebetween. Prior to the striking of an arc, therefore, all of the electrodes will be lowered as a result of the high arc voltage existing when no current flows.

During normal furnace operation the electrodes are worn away, consumed and broken off so that their relative lengths become non-uniform. Upon the completion of a furnace operation, the electrodes are raised to a position above the furnace charge and when the subsequent furnace operation is initiated the electrodes are relowered toward the furnace charge at a uniform rate so that the longest will contact the charge first. Because prior art electrode raising means are dependent on arc current, the first electrode to contact the melt remains partially immersed therein until one of the other electrodes makes contact therewith so that arc current can begin to flow. It is only after the flow of electrode current begins can prior art furnace control means lift the electrode out of the furnace charge.

If, as is often the case, the difference in electrode lengths is substantial, the longest electrode remains dipped in the furnace melt for an inordinate length of time causing it to begin burning and thereby adding carbon to the melt. It can be seen, therefore, that this electrode dipping is extremely undesirable in the production of high grade steel wherein the amount of carbon must be closely controlled.

It is an object of the invention to provide a polyphase electric arc furnace with auxiliary control means for preventing the dipping of the electrodes upon the initiation of furnace operation.

It is another object of the invention to provide an auxiliary arc furnace electrode control means which can raise the electrodes without the flow of electrode current.

It is a further object of the invention to provide auxiliary arc furnace electrode control means which raises the first electrode to contact the furnace charge upon the initiation of a furnace operation and to hold said electrode in a raised position until another electrode contacts the charge.

It is yet another object of the invention to provide an arc furnace electrode control means which raises the first electrode to experience a loss in voltage upon the initiation of a furnace operation, until one of the other electrodes similarly experiences a voltage loss.

This and other objects of the invention will become apparent from the detailed description of the instant invention taken in view of the drawing which shows a preferred embodiment thereof.

In general terms, the invention comprises providing an electric arc furnace having a plurality of electrodes with positioning means for raising and lowering each of the electrodes relative to the furnace charge, and control means operable upon the lowering of said electrodes toward said charge for actuating said positioning means to raise the first of said electrodes to contact said charge until contact is made by one of the other of said electrodes. In the preferred embodiment of the invention, use is made of the fact that upon engagement of the furnace charge by one of the electrodes the voltage drops substantially to zero. Accordingly, means are provided which are responsive to a voltage loss in the electrodes for actuating said positioning means to raise said one electrode and to maintain said electrode in a raised position relative to said furnace charge until there is a corresponding voltage loss in one of the other electrodes. The auxiliary control means includes transducer means comprising voltage responsive means and relay means coupled to each of the electrodes and to said electrode positioning means and adapted to energize said electrode positioning means for raising the initial one of said electrodes to experience a voltage loss and to de-energize said electrode raising means when there is a corresponding voltage drop in one of the other electrodes. The voltage responsive means preferably comprises an amplifier means such as a magnetic amplifier or saturable reactor whose load windings are disposed between the relay means and a source of electrical energy and whose control winding is energized by a D.C. voltage proportional to the voltage of its respective electrode. As long as an electrode voltage exists, current flows through the load windings to the relay means. However, when there is a loss in electrode voltage and, consequently, a de-energization of the control windings, the flow of current through the load windings ceases or is substantially reduced so that the relay means drops out thereby actuating electrode raising means. When one of the other electrodes contacts the furnace charge, causing a voltage loss in its associated control winding, the current to its relay means is also substantially reduced whereupon the electrode raising means is de-energized.

Referring now to the drawing in greater detail, an electric arc furnace 1 is illustrated having a shell 2 containing a bath of molten furnace charge 3 and three movable electrodes 7, 7' and 7'' positioned above the melt 3. The electrodes 7, 7' and 7'' are connected to three phase supply conductors 10, 10' and 10'' respectively, which are, in turn, connected to a suitable source of three phase power (not shown). A hydraulic electrode positioning means 12 is mechanically connected to each of said electrodes by an electrode positioning arm 13 so that said electrodes may be raised and lowered in accordance with furnace conditions. Since identical operating mechanisms are provided for controlling the positioning of each of said electrodes only one of them is illustrated in detail for the sake of brevity. The hydraulic raising and lowering device may be controlled in accordance with electrode current and voltage conditions by any suitable means well known in the art, such as reversible D.C. torque control motor 14 adapted to operate valve means 15 disposed in a hydraulic supply line 16 connecting the hydraulic positioning means 12 to a source of hydraulic fluid under pressure 17. It will be understood by those skilled in the art that the particular schematically illustrated electrode positioning system just discussed is merely intended as an example and forms no part of the instant invention.

The reversible D.C. torque control motor 14 has an armature winding 18 energized from any suitable power source (not shown) when the system is in operation, and a pair of field coils 20 and 21 wound in such a manner that they will exert exposing torques on the motor armature 22 which is mechanically connected to valve means 15. Valve means 15 is so arranged that rotation of armature 22 in a first direction, under the influence of field coil 20 will result in a direction of fluid flow between the source of hydraulic fluid 17 and the hydraulic positioning means 12 which causes a raising of the electrode 7, while rotation of armature 22 in the opposite direction, under the influence of field coil 21 operates valve means 15 in a manner which results in a lowering of said electrode. The positioning means 12 holding arm 13, motor 14, valve means 15, hydraulic supply line 16 and hydraulic source 17 are all well known in the art and are, therefore, merely symbolized in the drawing since it is not necessary to know their specific details in order to understand the instant invention.

Field coils 20 and 21 of motor 14 are electrically connected to supply conductor 10 in such a manner that they will cause a raising or lowering of electrode 7 as power conditions in the arc of electrode 7 fluctuate above or below the condition which it is desired to maintain. To this end, power is supplied from the conductor 10 through an electrical control circuit 30 in such a manner that the voltage across lowering coil 21 will be proportional to the voltage of electrode 7 and the voltage across raising coil 20 will be proportional ot current flowing in supply conductor 10. Electrode current is sensed by means of a current transformer 32 whose secondary is inductively coupled to supply conductor 10 and voltage proportional to this current is derived by means of an adjustable resistor 33 shunting the secondary of current transformer 32. This derived voltage is rectified by bridge type rectifier 35 whose output is connected to electrode raising coil 20. A second variable resistor 36 connects the electrode lowering coil 21 to the power supply conductor 10 through a second bridge type rectifier 38 so that the voltage across lowering coil 20 will be proportional to the voltage drop across electrode 7. By suitably adjusting resistors 33 and 36 the voltage in the raising coil 20 and the lowering coil 21 can be made equal when the predetermined desired voltage and current conditions exist in electrode 7, whereby the electrode will remain stationary. If the electrode current should thereafter rise, indicating that the arc gap is too small, an increased voltage drop will appear across resistor 33 thereby increasing the voltage across raising coil 20 which then rotates armature 22 in an electrode raising direction. As this electrode raises, the arc length is increased, causing the electrode current to diminish and the electrode voltage to rise, so that after a predetermined electrode travel, the voltages across coils 20 and 21 will be re-balanced and the electrode will again come to rest. Conversely, if the electrode voltage increases, indicating that the arc gap is too large, an increased voltage will be received by lowering coil 21, causing armature 22 to turn in an electrode lowering direction thereby increasing arc current and decreasing arc voltage until the voltage across raising and lowering coils 20 and 21 are again balanced. It is understood that the electrode voltage and current of each of the other electrodes 7' and 7" is sensed by control circuits (not shown) identical to control circuit 30 for supplying voltage to the raising and lowering coils of their associated control motors 14' and 14".

Upon the commencement of a furnace operation, the electrodes 7, 7' and 7" will be a substantial distance above the furnace charge 3 so that no electrode current will flow. Consequently, only the lowering coil 21, 21' and 21" of the control means 14, 14' and 14" will be energized so that each of the electrodes 7, 7' and 7" will be lower at a substantially uniform rate. Assume now, for the sake of illustration, that electrode 7 is longer than electrodes 7' and 7" so that it is the first to make contact with the furnace charge 3. Upon this occurrence, its electrode voltage will drop to zero and its lowering coil 21 will be de-energized. Because current flow is between electrodes and because none of the other electrodes 7' and 7" are as yet in contact with the furnace charge, the raising coil 20 will also remain de-energized, so that electrode 7 will come to rest with its tip slightly immersed in the furnace charge 3.

The auxiliary electrode control means 40, which constitutes the instant invention is coupled to each of the electrodes and to each of the control motors 14, 14' and 14" and is adapted and arranged to raise the initial electrode contacting the furnace charge until one of the other electrodes comes in contact therewith. This is accomplished by voltage responsive means operable upon a loss in voltage in one of the electrodes to raise it above the furnace charge until there is a voltage loss in one of the other electrodes. The control means 40 includes three identical portions, one being associated with each of the electrodes, and accordingly the components of each portion have the same reference numerals with the exception that those components associated with electrode 7' are distinguished by a prime (') while those associated with electrode 7" bear a double prime ("). More specifically, the auxiliary control means 40 comprises voltage sensitive means 42, 42' and 42" coupled to electrodes 7, 7' and 7" respectively and each of which is electrically disposed between a source of electrical energy 44 and its associated relay means 46, 46' and 46" respectively. Each of the voltage sensitive means 42, 42' and 42" and its associated relay means 46, 46' and 46" are operative upon the loss of voltage in the electrode to which they are coupled to place an auxiliary electrode control coil 48, 48' and 48" in control motors 17, 17' and 17" in circuit with a second source of electrical energy 50, so that its associated electrode will be raised out of contact with the furnace charge 3. The control means 40 is also operable upon the engagement of a second electrode with the furnace charge 3 to cause the interruption of power to the auxiliary raising coil of the first electrode to contact said charge.

In the preferred embodiment of the invention the voltage sensitive means 42, 42' and 42" comprise identical magnetic amplifiers; however, for the sake of simplicity, only magnetic amplifier 42 will be discussed in detail. Magnetic amplifier 42 includes a three legged core 52 and a pair of series connected load windings 54 and 56 each having the same number of turns and each being wound on one of the outside legs of core 52 in such a manner that they will produce instantaneous alternate current flux patterns in the center leg which are out of phase so that the net steady state flux linking the center leg is substantially zero. A first control winding 60 is wound on the center leg of core 50 and is connected to the output terminals of the first bridge type rectifier 35 so that it will receive a voltage proportional to the current flowing in supply conductor 10. A second control coil 61 is wound on the central leg of core 50 in a flux aiding sense relative to the first control winding 60 and it is connected to the output of the second bridge type rectifier 38 so that it receives a rectified voltage proportional to the voltage of electrode 7. Series conected load windings 54 and 56 are connected to alternating current source 44 through conductors 62, 63, 64, 65, relay means 46, and conductor 66. It is understood that control windings 60' and 61' of magnetic amplifier 42' and 60" and 61" of magnetic amplifier 42" are similarly connected to their respective electrodes 7' and 7".

Relay means 46 includes a first relay 70 whose coil is in series between conductors 64 and 66 and the second relay 72 whose coil is connected between conductors 64 and 74. Relay coil 70 operates contacts 76 which are in series with the coil of relay 72 and which are normally opened when coil 70 is energized. Relay coil 70 also operates contacts 78 and 80 which are disposed in conductors 74' and 74" respectively and which are each normally closed when relay 70 is energized. Relay coil 72 operates normally open contacts 82 which are disposed in conductor 86 connecting auxiliary control coil 48 with a D.C. power source 50. Each of the other magnetic amplifiers 42' and 42" and each of the other relay means 46' and 46" associated with electrodes 7' and 7" respectively are connected in parallel with magnetic amplifier 42 and relay means 46 between conductors 62 and 66 and the components and internal connections of each is identical with the corresponding components heretofore discussed in magnetic amplifier 42 and relay means 46. As stated previously these components and internal connections have the same reference numerals as those associated with magnetic amplifier 42 and relay means 46 with the exception that those associated with electrodes 7' and 7" have primes (') and double primes (") respectively. It can be seen, therefore, that contacts 78 of relay 70 and contacts 78" of relay 70" are serially disposed in conductor 74' and each is normally closed when relays 70 and 70" are energized. In a similar manner contacts 80 of relay 70 and 78' of relay 70' are serially disposed in conductor 74" and contacts 80' of relay 70' and 80" of relay 70" are serially disposed in conductor 74 and all are closed when their relays are energized. Also contacts 82' and 82" of relays 72' and 72" are disposed in conductors 86' and 86" respectively.

In operation, when each of the electrodes is descending, upon the initiation of the furnace operation but prior to the contacting of the furnace charge 3 by any of them, a voltage will exist in control windings 61, 61' and 61" of magnetic amplifiers 42, 42' and 42" respectively. As a result of these voltages, load windings 54—56, 54'—56' and 54"—56" of the magnetic amplifiers will conduct current to its associated relays 70, 70' and 70" so that contacts 76, 76' and 76" will remain open and relays 72, 72' and 72" will remain de-energized.

Assuming again for the sake of illustration, that electrode 7 contacts the furnace charge 3 prior to electrodes 7' and 7", the voltage in control coil 61 will go to zero. It will be remembered that no electrode current flows until one of the other electrodes contacts the furnace charge 3. With the loss of voltage in control winding 61 the impedance of load windings 54 and 56 increases substantially to effectively cut off the flow of current to relay 70 whereupon it drops out, closing contacts 76 and opening contacts 78 and 80. However, because electrodes 7' and 7" have not as yet contacted the charge 3, the control windings 61' and 61" of magnetic amplifiers 42' and 42" remain energized. As a result, current continues to flow between conductor 63 and conductors 64' and 64" so that relays 70' and 70" remain energized and contacts 76' and 76" remain open, while contacts 78', 78", 80' and 80" remain closed.

Upon the closing of contact 76, current begins flowing through relay 72 through the circuit defined by conductors 73 and 74, relay 70, and contacts 80' and 80", whereupon its contacts 82 close. It can be seen that the closing of contacts 76 also re-energizes relay 70 but it is prevented from operating by time delay means 90.

The closing of normally open contacts 82 completes the circuit between auxiliary control coil 48 and the D.C. voltage source 50 through conductors 91 and 92. Auxiliary control coil 48 is wound in such a manner that it will tend to rotate armature 22 in an electrode raising direction, and this torque will be unopposed because the voltage and current in electrode 7 are zero, and consequently there will be no voltage in either of the coils 20 or 21. However, when electrode 7 has been raised to the point where it is clear of the furnace charge 3, electrode voltage will reappear across it and as a result across lowering coil 20 which thereby produces a torque in armature 22 in opposition to that produced by auxiliary control coil 48. By properly dimensioning control coil 20 and auxiliary control coil 48, their torques can be made to cancel when electrode 7 reaches a predetermined height above the charge 3 whereupon the electrode will come to rest and remain in this position until one of the other electrodes contacts the furnace charge 3.

Assume again for the sake of illustration that when electrode 7 is held in its elevated position by coils 20 and 48, electrode 7' contacts furnace charge 3. Upon this event, its arc voltage will go to zero and its associated magnetic amplifier 42' will interrupt the current flow to relay 70' in the manner discussed previously with respect to magnetic amplifier 42, so that contacts 78' in conductor 74" and contacts 80' in conductor 74 will open. The opening of contacts 80' open circuits relay winding 72 so that contacts 82 open and auxiliary winding 48 becomes de-energized. The operation of relay 70' also closes contacts 76' but relay 72' is prevented from operating because time delay 90 on relay 70 holds open contacts 78 in conductor 74 and contacts 80 in conductor 74".

Upon the release of relay 72 contacts 82 open thereby open circuiting auxiliary control coil 48 and allowing electrode 7 to again be lowered under the influence of lowering coil 21. Because electrode 7 is a very short distance above furnace charge 3, an arc will be struck between it and the charge in a very short time whereupon current can flow between electrodes 7 and 7' and each of these electrodes can be regulated according to their voltage and current conditions by their respective motors 14 and 14' in the normal manner. Similarly, when the third electrode 7" contacts the melt current will flow between it and electrodes 7 and 7' and all three electrodes will be regulated in their normal manner. After a predetermined time delay relays 70 and 70' are reset in preparation for another furnace operation.

As soon as current begins to flow in each of the electrodes a voltage will appear across the control windings 60, 60' and 60" of their associated magnetic amplifiers 42, 42' and 42" so that at all times during normal operation of the furnace a voltage will appear across at least one of the control windings of each magnetic amplifier so that relays 70, 70' and 70" will at all times be energized and the closing of contacts 82, 82' and 82" prevented. Thus, control windings 60, 60' and 60" insure against the interference of normal furnace operation by auxiliary control coils 48, 48' and 48".

Although only a single preferred embodiment of the invention has been described, it will be understood by those skilled in the art that it may take a number of different forms and be variously embodied without departing from the true spirit thereof. It is, therefore, to be construed according to the appended claims.

I claim:

1. In an electric arc furnace having a plurality of electrodes connected to a source of electrical energy for effecting a voltage drop and current flow in said electrodes, the combination of positioning means for raising and lowering each of said electrodes in accordance with their respective electrode voltage and current conditions, auxiliary control means for said positioning means including voltage responsive means coupled to each of said electrodes and responsive to the voltage and current therein, said auxiliary control means also including relay means operable by said voltage responsive means upon a predetermined drop in voltage in one of said electrodes for actuating a portion of said positioning means to raise said one electrode, said relay means also being operable by said voltage responsive means in response to a loss in voltage in one of said other electrodes for de-actuating said portion of the positioning means so that said positioning means may again move said electrodes without interference from said auxiliary control means.

2. In an electric arc furnace having a plurality of electrodes connected to a source of electrical energy wherein a voltage drop and current flow are effected in said electrodes, the combination of positioning means for raising and lowering each of said electrodes in accordance with their respective voltage and current conditions, and auxiliary control means for said positioning means, said auxiliary control means including an amplifier means and circuit means associated with each of said electrodes, each of said amplifier means having an input coupled to its associated electrode and an output coupled to its associated circuit means whereby the voltage at said input controls the energy at said output, each of said circuit means being operable by a predetermined drop in the energy at said output for actuating a portion of said positioning means to raise its associated electrode so that upon the initiation of a furnace operation the first electrode to experience a substantial voltage drop upon contacting the charge in said furnace will be raised out of contact therewith, said circuit means also being responsive to a loss in voltage in one of said other electrodes for de-actuating said portion of the positioning means so that when a second electrode contacts said charge said positioning means may again position said electrodes without interference from said auxiliary control means.

3. In an electric arc furnace having a plurality of electrodes connected to a source of electrical energy wherein a voltage drop and current flow are effected in said electrodes, the combination of positioning means for raising and lowering each of said electrodes in accordance with their respective voltage and current conditions, and auxiliary control means for said positioning means, said auxiliary control means including a magnetic amplifier associated with each electrode and having load windings and control windings, the load windings of each of said magnetic amplifiers being in circuit with a source of electrical energy, the control windings of each of said magnetic amplifiers being connected to its associated electrode so that it is energized by a voltage proportional to the voltage therein, said auxiliary control means also including a relay means associated with each electrode and being in series with the load windings of its corresponding magnetic amplifier and operable by a predetermined drop in the current flowing therein to actuate a portion of said positioning means for raising its associated electrode so that upon the initiation of a furnace operation the first electrode to experience a substantial voltage drop upon contacting said furnace charge will be raised out of contact therewith, said relay means also being responsive to a substantial loss in voltage in one of the other electrodes for de-actuating said portion of the positioning means so that when a second electrode contacts said furnace charge said positioning means may position said electrodes without interference from said auxiliary control means.

4. The device as set forth in claim 3 wherein each magnetic amplifier is provided with an additional control winding, and including circuit means connecting each of said additional control windings with its associated electrode, said circuit means being operable to produce a voltage proportional to the current in said associated electrode so that at least one of the control windings in each magnetic amplifier will be energized at all times once normal furnace operation has commenced.

5. In an electric arc furnace having a plurality of electrodes connected to a source of electrical energy for effecting a voltage drop and current flow in said electrodes, the combination of positioning means for raising and lowering each of said electrodes in accordance with their respective electrode voltage and current conditions, auxiliary control means for said positioning means including voltage responsive means coupled to each of said electrodes, relay means energized by said voltage responsive means and operable upon a predetermined voltage drop in one of said electrodes when the same engages said melt for actuating a portion of said positioning means to raise said one electrode, said relay means also being operable by said voltage responsive means in response to a loss in voltage in one of said other electrodes when it also engages said melt for actuating said portion of the positioning means so that said positioning means may again move said electrodes without interference from said auxiliary control means, and current responsive means also coupled to each of said electrodes and to said relay means for energizing the latter when electrode current flows, so that said relay means will be continuously energized after a plurality of electrodes have contacted said melt.

6. In an electric arc furnace having a plurality of electrodes connected to a source of electrical energy for effecting a current flow and a voltage drop between said electrodes and a charge of metal in said furnace, the combination of, electrode positioning means for raising and lowering each of said electrodes relative to said furnace charge in accordance with the electrical conditions in each electrode, and auxiliary control means coupled to each of said electrodes and to said positioning means and including means responsive to the contacting of said furnace charge by one of said electrodes for actuating said electrode positioning means to raise the first of said electrodes to make contact with said furnace charge upon the initiation of a furnace operation and to hold said electrode in an elevated position relative to said melt while said positioning means continues to lower the remaining electrodes, said auxiliary control means also including means responsive to the contacting of said furnace charge by a second one of said electrodes to release said first electrode for raising and lowering by said positioning means in accordance with electrical conditions therein.

7. In an electric arc furnace having a plurality of electrodes connected to the source of electrical energy for effecting a voltage drop and current flow in said electrodes, the combination of, a main control means for positioning each of said electrodes in accordance with their respective voltage and current conditions, auxiliary control means coupled to each of said electrodes and to said positioning means and including a first voltage means responsive to a loss in voltage in one of said electrodes for actuating said positioning means to raise said one electrode and to hold said electrode in an elevated position relative to said melt, said auxiliary control means also including a second voltage means responsive to a loss in voltage in one of the other of said electrodes for releasing said first electrode for normal operation by said main control means.

References Cited in the file of this patent

UNITED STATES PATENTS

| 1,248,632 | Dixon | Dec. 4, 1917 |
| 1,449,896 | Evans | Mar. 17, 1923 |
| 1,573,095 | Saklaturalla | Feb. 16, 1926 |